May 29, 1956 M. BALDWIN 2,747,545
REMOVABLE BOTTOM FOR BIRD CAGES
Filed Sept. 27, 1954

MACK BALDWIN
*INVENTOR.*

BY Hubert E. Metcalf
*ATTORNEY*

United States Patent Office 2,747,545
Patented May 29, 1956

2,747,545

REMOVABLE BOTTOM FOR BIRD CAGES

Mack Baldwin, Redondo Beach, Calif.

Application September 27, 1954, Serial No. 458,343

3 Claims. (Cl. 119—17)

My invention relates to cages and more particularly to a bird cage or the like, easy to clean.

An object of the invention is to provide a bird cage wherein the solid bottom is readily separable from the wire top.

Another object of the invention is to provide easily separable top and bottom cage portions.

A further object of the invention is to provide a simple bird cage construction.

A still further object is to provide a bird cage that can be kept clean and sanitary without removing the birds therefrom.

In brief, a cage embodying my invention includes a shallow base pan into which an upwardly extending cage portion is inserted. The cage is held to the base pan by headed lugs extending inwardly from the sides of the pan, the heads of these lugs passing over a bottom edge wire of the cage portion. The lugs are preferably extended from opposite sides of the base pan with one lug in the middle of one side and two spaced lugs on the opposite side. By springing the side of the base pan with the one lug thereon the adjacent bottom cage wire can be released to permit the cage to be tilted. After tilt a slight relative movement of cage and base pan permits the cage portion and the entire base pan to be completely separated, in order that the latter be cleaned, for example.

Figure 1:
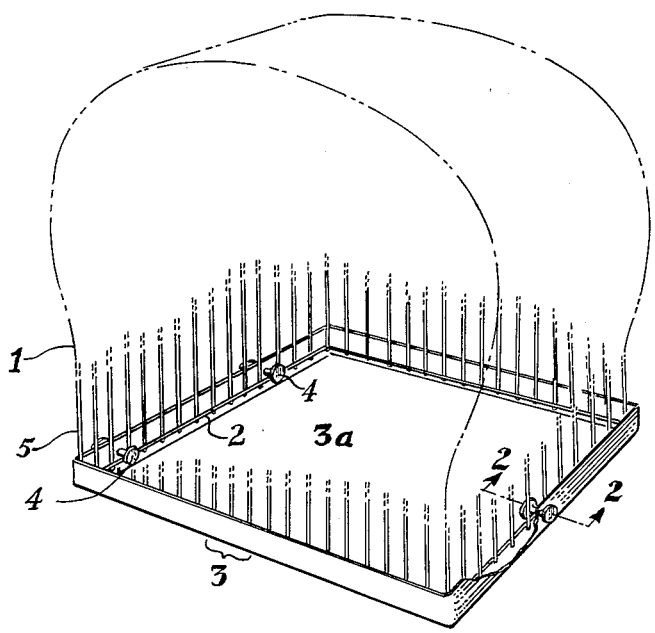
Figure 1 is a perspective view of cage and base pan of a preferred embodiment of my invention, only a portion of the cage wires being drawn.

Referring to the figures, a cage 1 of conventional canary or parakeet design is, as customary, open at the bottom, the bottom edge of the cage 1 being a bottom edge wire 2 extending completely around said edge.

A base pan 3 is provided with a solid bottom 3a and shallow sides 3b. The pan is dimensioned so that the bottom edge wire 2 rests on bottom 3a just inside the shallow sides 3b of the base pan 3.

To hold the cage 1 to the base pan 3, two spaced headed holding lugs 4 are extended inwardly from one shallow side 3b. The heads on lugs 4 are sized to pass between upright wires 5 of cage 1, beyond and over bottom edge wire 2 as shown at L in Figure 3.

Figure 2:
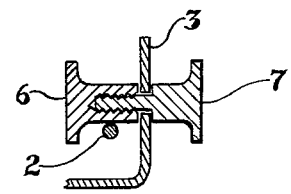
Figure 2 is an enlarged sectional view of the base release lug used in the device of Figure 1.
Figure 3:
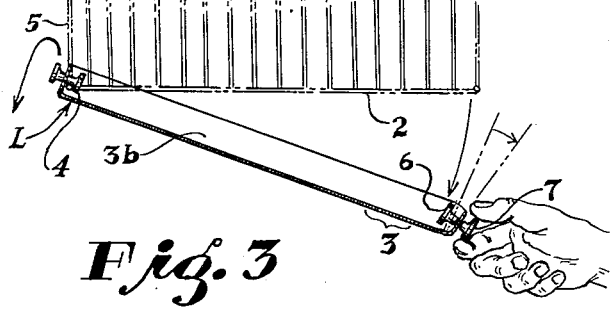
Figure 3 is a diagram showing how the cage and base pan can be tilted for access to the bottom of the base pan.

A single locking lug 6 extends upwardly to drop over wire 2 in a manner similar to holding lugs 4, as shown in Figure 2. Thus when both holding lugs 4 and the locking lug 6 are extended over bottom wire 2, the cage 1 and base pan 3 are secured together. The cage, however, can readily be removed from the base pan by raising the base pan with respect to the cage and then bending the side 3b on which the locking lug 6 is mounted, outwardly until the head of locking lug 6 outwardly clears the bottom wire 2 of the cage. This bending is facilitated by the use of handle 7. The cage and bottom can then be moved relatively as shown in Figure 3, the holding lugs 4 hinging on bottom wire 2. Thus access is provided to the base pan. If complete removal of the cage from the base pan is desired, then the heads of the holding lugs 4 can be lifted over bottom wire 2, thereby completely separating the two cage portions.

During this removal the birds do not ordinarly attempt to escape from the open bottom of the cage, remaining at or near the top of the cage. After separation from the base, the cage can be rested on a newspaper, for example, as a temporary base. By being constructed so that the entire base pan can be completely removed from the cage proper, the base pan can be kept clean and sanitary, a condition not generally obtained with ordinary cages unless the birds are completely removed from the cage.

While in order to comply with the statute, the invention has been described in language more or less specific as to structural features, it is to be understood that the invention is not limited to the specific feaures shown, but that the means and construction herein disclosed comprise a preferred form of putting the invention into effect, and the invention is therefore claimed in any of its forms or modifications within the legitimate and valid scope of the appended claims.

What is claimed is:

1. A bird cage comprising a rectangular base pan, a straight perpendicular wall of resilient material extending around said pan and connected thereto, a rectangular cage portion having a bottom edge formed from horizontally extending wire, the bottom portion of said cage being dimensioned to be slightly smaller than said base pan so that said bottom portion will fit just inside said wall of said base pan, with the bottom wire edge of said cage positioned adjacent the bottom of said pan, and a plurality of fixed oppositely disposed lugs extending inwardly from the walls of said base pan, said lugs having heads of increased diameter thereon passable through said cage and extendible over said bottom edge wire by appropriate flexure of said wall, said pan being supported by said lugs resting on said bottom wire, said lugs being movable outwardly to clear said bottom wire by outward flexure of said wall to remove said pan from said cage.

2. A bird cage comprising a rectangular base pan, a straight perpendicular wall of resilient material extending around said pan and connected thereto, a rectangular cage portion having a bottom edge formed from horizontally extending wire, the bottom portion of said cage being dimensioned to be slightly smaller than said base pan so that said bottom portion will fit just inside the wall of said base pan with the bottom wire edge of said cage positioned adjacent the bottom of said pan, a pair of spaced holding lugs in fixed position extending inwardly from one of the walls of said base pan, said holding lugs having heads of increased diameter thereon passable through said cage to extend over and rest upon said bottom wire, and a fixed locking lug on the opposite side of said base pan substantially midway between the other two sides, said locking lug having a head of increased diameter thereon passable through said cage to extend over and rest upon said bottom wire, whereby said three lugs constitute the sole support for said base pan on said cage, the wall to which said locking lug is attached being capable of flexure outwardly to retract the head of said locking lug from inside said cage to enable said base pan to be lowered away from said cage.

3. A bird cage comprising a rectangular imperforate base pan, said pan having a resilient wall extending perpendicularly therefrom and enclosing all sides thereof, a rectangular cage portion having a bottom edge formed from horizontally extending wire, the bottom portion of said cage being dimensioned to be slightly smaller than said base pan so that said bottom portion will fit just inside said wall of said base pan with the bottom wire edge of said cage positioned adjacent the bottom of said pan, a pair of spaced supporting lugs in fixed position and extending inwardly from a portion of said base pan wall, said holding lugs having heads of increased diameter thereon passable through said cage to extend over and rest upon said bottom wire, and a fixed locking lug on the opposite side of said base pan positioned substantially midway between the other two walls, said locking lug having a head of increased diameter thereon passable through said cage to extend over and rest upon said bottom wire, whereby said three lugs rest upon said bottom wire to support said base pan under said cage, the wall to which said locking lug is attached being capable of flexure outwardly to retract the head of said locking lug from said cage to lower said pan from said cage, and graspable means extending outwardly from the vicinity of said locking lug for facilitating manual flexure of said wall to retract said locking lug from said cage.

References Cited in the file of this patent

UNITED STATES PATENTS

| | | |
|---|---|---|
| 1,929,584 | Havlis | Oct. 10, 1933 |
| 2,030,077 | Skiles | Feb. 11, 1936 |